H. CLEGG.
APPARATUS FOR THE PURPOSE OF PROVIDING PUBLIC AMUSEMENT AND EXERCISE.
APPLICATION FILED FEB. 11, 1920.

1,354,021.

Patented Sept. 28, 1920.

Inventor
Herbert Clegg
Herbert W. Jenner.
By his Attorney :—

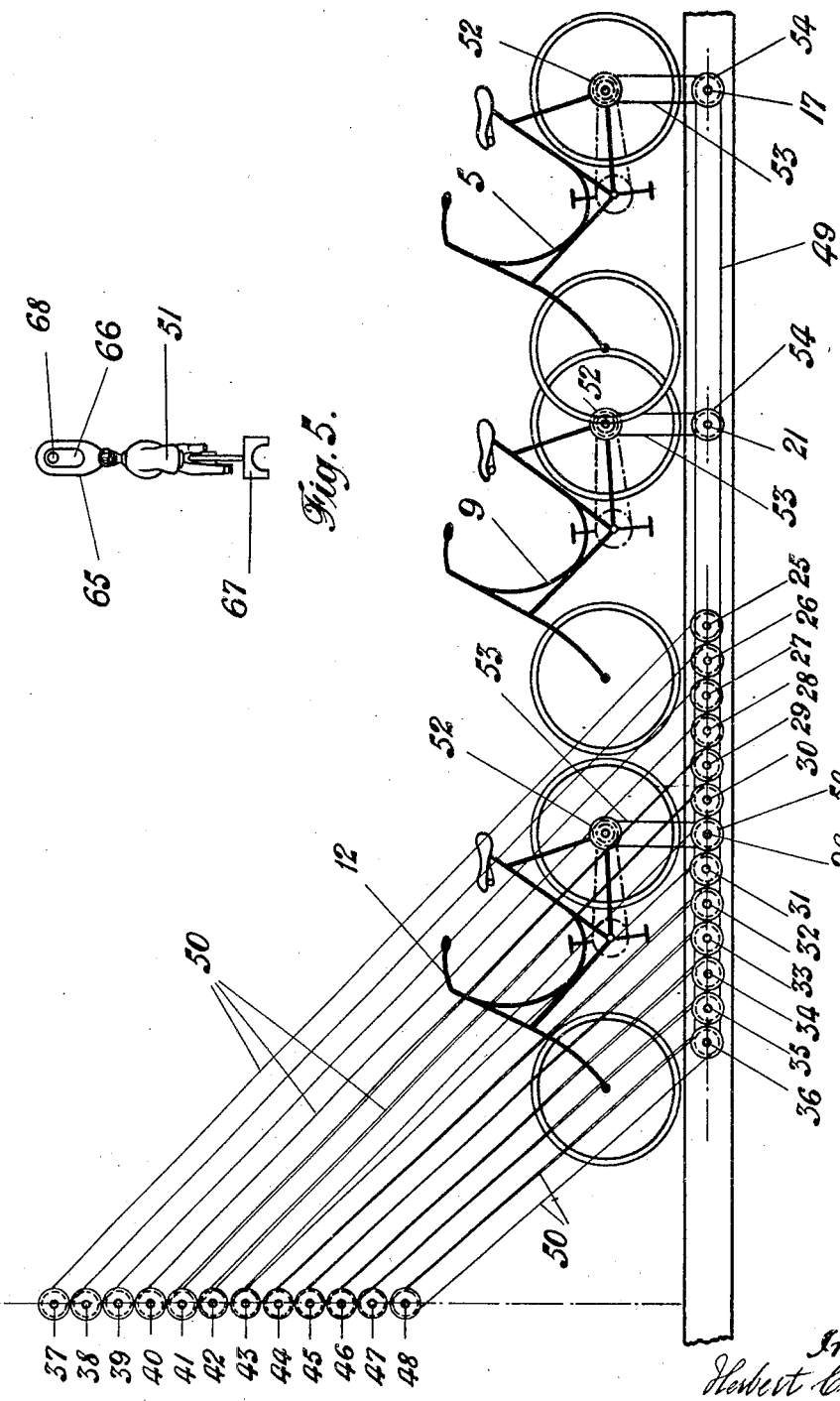

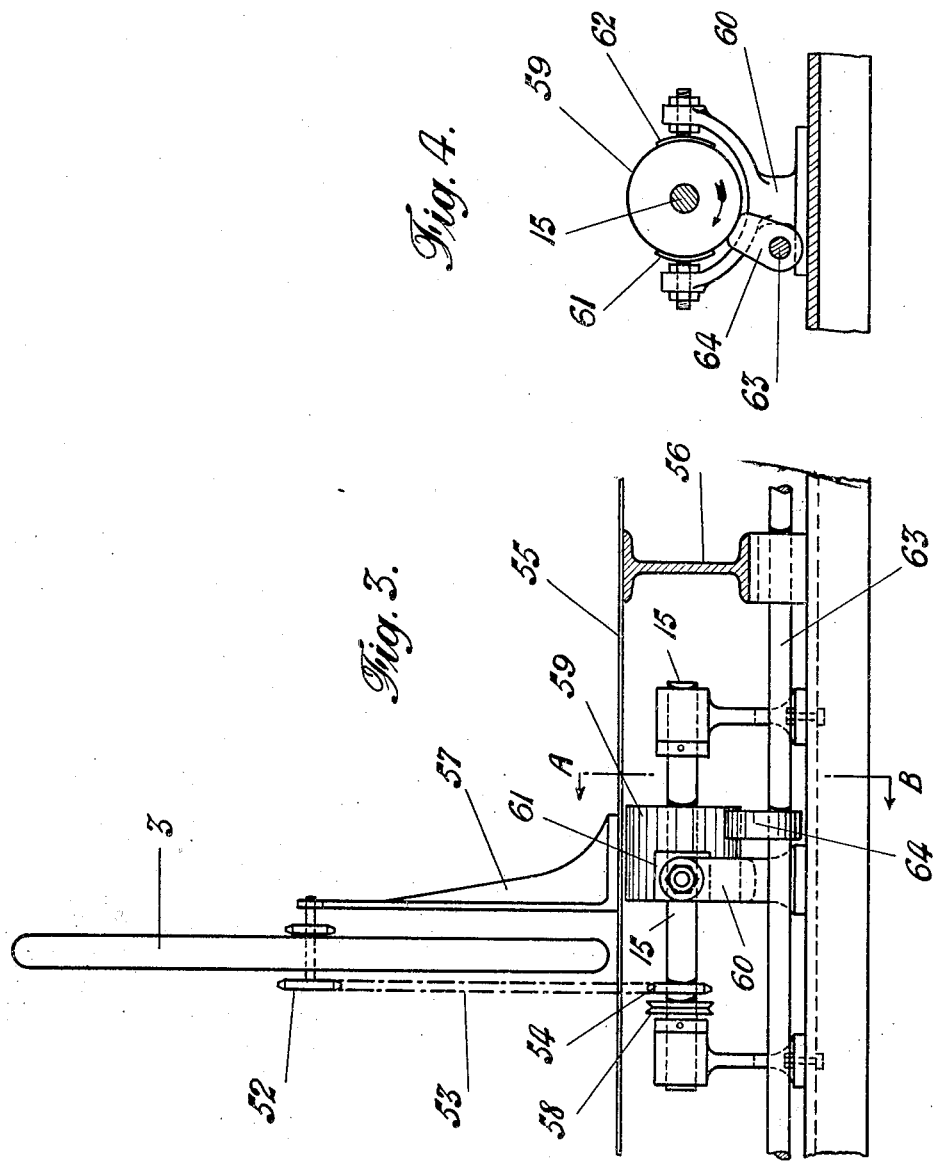

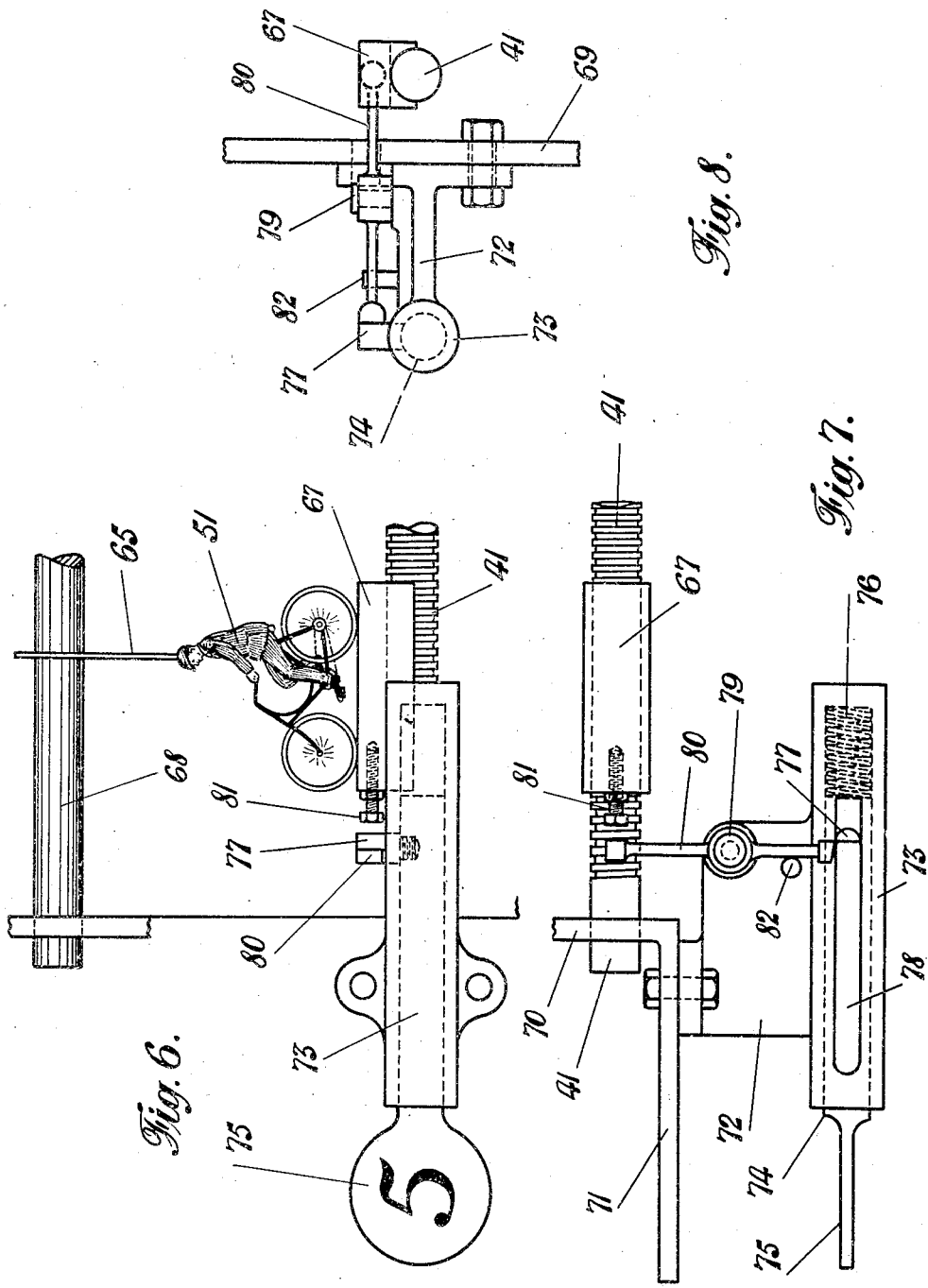

UNITED STATES PATENT OFFICE.

HERBERT CLEGG, OF BURNLEY, ENGLAND.

APPARATUS FOR THE PURPOSE OF PROVIDING PUBLIC AMUSEMENT AND EXERCISE.

1,354,021.  Specification of Letters Patent.  Patented Sept. 28, 1920.

Application filed February 11, 1920. Serial No. 357,841.

*To all whom it may concern:*

Be it known that I, HERBERT CLEGG, subject of the King of Great Britain, residing at Burnley, in the county of Lancaster, England, have invented certain new and useful Improvements in Apparatus for the Purpose of Providing Public Amusement and Exercise, of which the following is a specification.

The subject of this invention is an apparatus comprising a number of fixed or stationary bicycles or the like, worked by the riders in the ordinary manner as if pedaling on the road, in combination with a corresponding number of small models each operated through suitable gearing from one of such stationary machines, each of such models being arranged to move over a comparatively short distance at a speed dependent on the number of revolutions imparted by the rider to the crank of his bicycle, and the models being arranged in view of the riders and spectators in such manner as to give the effect of a race.

For example, twelve full-sized bicycles may have their frames secured to a steel structure, while their wheels can be rotated by foot action in the ordinary way, and the gear wheels connected by chains to shafts which will rotate twelve horizontal screws or worms in a separate structure on each of which screws travels a model of a man riding a bicycle. Each model after traveling a certain distance may operate an electrical or other device which will ring a bell and also indicate automatically which model was the first to make contact. Each competitor can tell at a glance at his model what progress he is making in the race.

Friction brakes having exactly the same frictional resistance for each bicycle, which is practically permanent, may be provided in order to make the pedaling conditions equivalent to those on the road, another set of such brakes being adapted to be instantly engaged or released by the attendant in charge of the apparatus, simultaneously before starting or after completing one race. The models should be so constructed that they can be readily disconnected from their screws and brought back to their starting points without winding back.

Fig. 2 represents in side elevation three of the set of twelve bicycles.

Fig. 3 is a rear elevation on a larger scale of one of such bicycles and its immediate connections.

Fig. 4 is a section taken on the line A—B in Fig. 3.

Fig. 5 is an elevation of one of the model bicycles in position on its screw.

Fig. 6 is a side elevation of the indicator mechanism.

Fig. 7 is a plan and Fig. 8 a rear elevation of the indicator mechanism.

Figure 1:
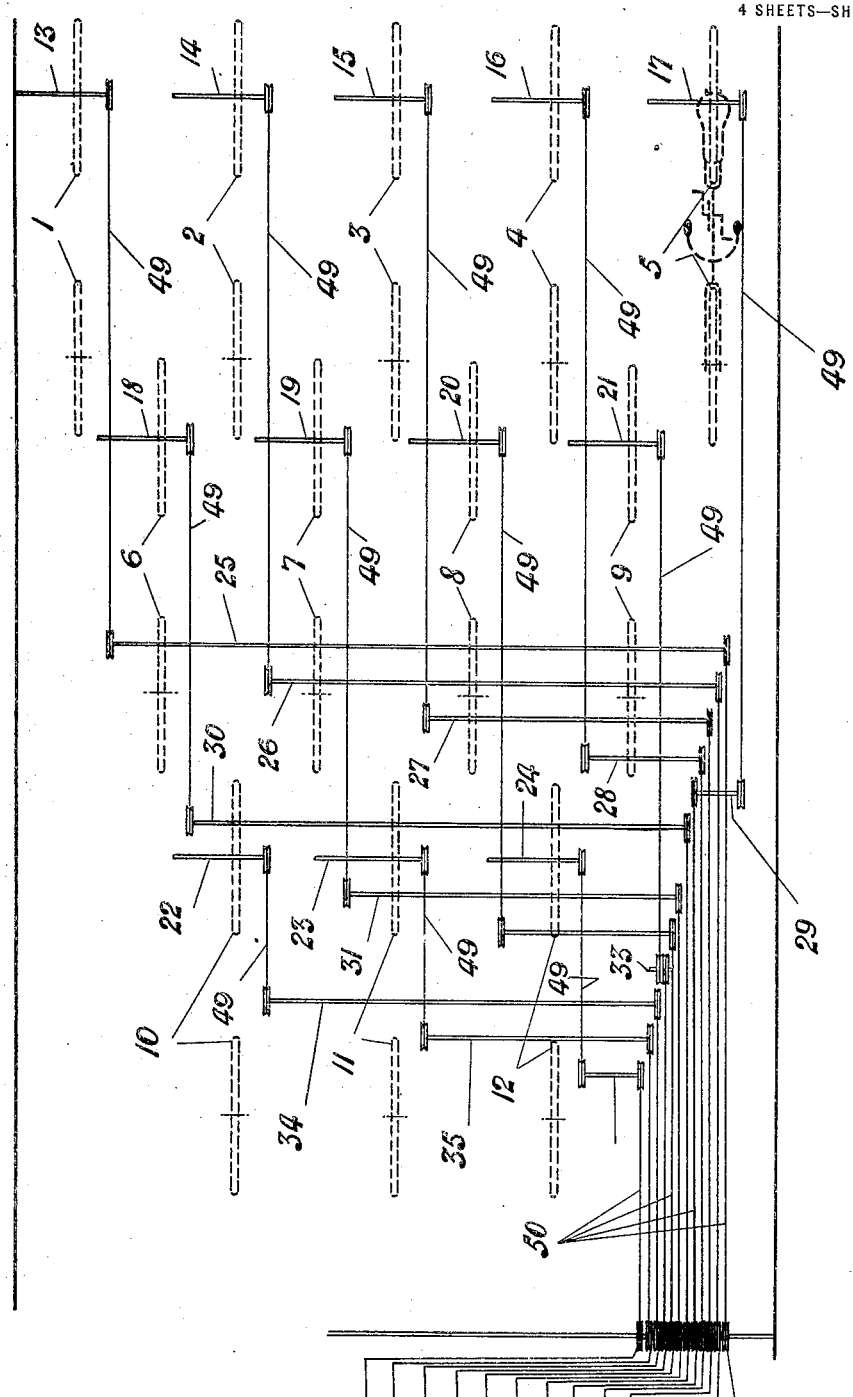
Figure 1 is a diagram of the plan or layout of the connections for the twelve bicycles arranged according to this invention.

Referring firstly to Fig. 1, the reference numerals 1 to 12 indicate the twelve full-sized bicycles, which are preferably of the type known as ladies' bicycles, so that they can be conveniently mounted and actuated by either males or females in ordinary clothing. The reference numerals 13 to 24 indicate the shafts to which the bicycles are geared. Each of these shafts is operatively connected by a belt 49 to a counter shaft, the twelve countershafts being respectively numbered 25 to 36. Each countershaft is operatively connected by a belt 50 to a screw, the screws being arranged in tiers across the front of the space occupied by the bicycles and their shafts, and numbered respectively 37 to 48. On each screw is to be placed a model bicycle 51 which is adapted to travel along the screw as the latter rotates. Thus the screw 37 is rotated through connections from the bicycle 1, the screw 38 is rotated through connections from the bicycle 2, and so on, the rate of movement of the model 51 on any screw being in each case dependent on the rate of revolution of the respective bicycle pedals.

Referring to Figs. 2 to 4, on the rear axle of each bicycle is mounted a sprocket wheel 52 operatively connected by a chain 53 to a sprocket wheel 54 on one of the shafts 1 to 12. A light floor 55 is supported at intervals by joists 56, and on this floor are pillars 57, to each of which one of the bicycles (say No. 3 in Fig. 3) is secured. On the shaft (15) is secured a pulley 58 around which passes the aforesaid belt 49, and also on the said shaft is secured a brake pulley 59. In a bracket 60 embracing this brake pulley are adjustably secured two friction plates or brake blocks 61 and 62 (Fig. 4), which are intended to be permanently adjusted to grip the pulley 59 to such an extent that the rider of the bicycle shall encounter a resistance to pedaling exactly equal to that which is similarly arranged in regard to the brake pulley of each of the other bicycles in the set. A shaft 63, which may be supported in bearings in each of the joists 56, also runs under the floor 55 and carries a number of cams or eccentric brake blocks, one of these, marked 64, being shown in Fig. 3; by slightly rotating this shaft 63, all the eccentrics in the row can be brought to bear tightly against the brake pulleys 59, so that the action of the several bicycle pedals will practically stop at once. The stopping shafts such as the shaft 63 under all the rows of bicycles are preferably geared together in any suitable manner, so that by actuating a single lever (not shown) the attendant can stop all the bicycles in the set. Instead of eccentrics, the parts 64 may be concave brake blocks put in action by lifting the shaft 63 by any suitable means.

The model 51 rides on a half-nut 67 traveling on the screw (37) and may have an upwardly projecting lug 65, Fig. 5, in which is an oval hole 66, engaging a small steadying rod 68. The half-nut 67 will be caused by gravity to engage the thread of the screw and travel thereon; but when the model is lifted so as to disengage its screw thread, it can be moved back to the starting point clear of the thread of the rotary screw and there again lowered into engagement ready for the beginning of the next race, the hole 66 permitting of this movement in relation to the rod 68. The pitch or distance between the center of the screw 37 and the center of the screw 38 may be for example six inches, the same between screw 38 and screw 39, and so on. Assuming the diameter of each screw to be 1 inch, the half nut model and lug may be 4 inches high in all so as to avoid fouling the next screw above.

Referring now to Figs. 6, 7 and 8, it may be assumed that the screw shaft 41, which is actuated from bicycle No. 5, is taken as an example, and that the rider of bicycle No. 5 is winning this race. To a vertical framework 69 is secured a bracket 70 comprising a forward extension or small screen 71; on the side of this screen is another bracket 72 carrying a cylinder 73, in which works a plunger 74 terminating in a number plate or disk 75. A confined spring 76 tends to increase the extent of the protrusion of the plunger and disk in relation to the cylinder. From the upper part of the plunger projects a stud 77, which can travel in a slot 78 in the upper surface of the cylinder. On the bracket 72 is a pillar 79 on which is rotatably mounted a two-armed lever 80, one end of which is adapted to be engaged and actuated by an adjustable set screw 81 on the front of the traveling half nut 67, while the other end of the said lever normally presses against the edge of the stud 77. The surfaces of the parts 77 and 80 which make contact are hardened to resist wear. A check stud 82 on the bracket 72 prevents the lever 80 from being moved beyond its required position by the stud 77 in consequence of the impulse of the spring 76. The stud 82 and lever 80 may be electrically insulated from adjacent parts of the mechanism, and electrically connected to an alarm-bell apparatus of the known type which rings when a normally completed circuit is broken. Thus on the screw 81 pressing against the right hand end of the lever 80, this lever moves out of contact with the stud 82 and the electric bell rings; the stud 77 will be pushed back against the resistance of the spring 76 until the edge or corner of the lever 80 slips off the said stud 77, the end of the lever being beveled as shown in Fig. 7, to permit the lever to swing clear of the stud 77; the spring 76 will then push out the plunger 74 and exhibit the number plate beyond the screen 71.

Similar indicating mechanism will be provided in connection with each of the twelve bicycles. A single electric alarm will serve the whole installation, as it will of course ring when the circuit is broken at any point.

What I claim is:—

1. In an amusement apparatus, a series of stationary pedal-actuated machines arranged parallel to each other and facing in the same direction, a series of screws arranged horizontally and parallel to each other and crosswise of the stationary machines, a series of slidable indicating devices operated by the said screws, and driving devices connecting each stationary machine with the driving screw of the indicating device pertaining to it to give the effect of a race.

2. In an amusement apparatus, a series of stationary pedal-actuated machines arranged parallel to each other and facing in the same direction, a series of screws arranged horizontally and one above another in a vertical plane, and arranged crosswise of and in front of the said stationary machines, a series of slidable indicating devices operated by the said screws, and driving devices connecting each stationary machine with the driving screw of the indicating device pertaining to the stationary machine to give the effect of a race.

In testimony whereof I affix my signature.

HERBERT CLEGG.